Sept. 17, 1968  M. EVANS ETAL  3,401,925
APPARATUS FOR SEPARATING MATERIALS
Filed Sept. 29, 1965
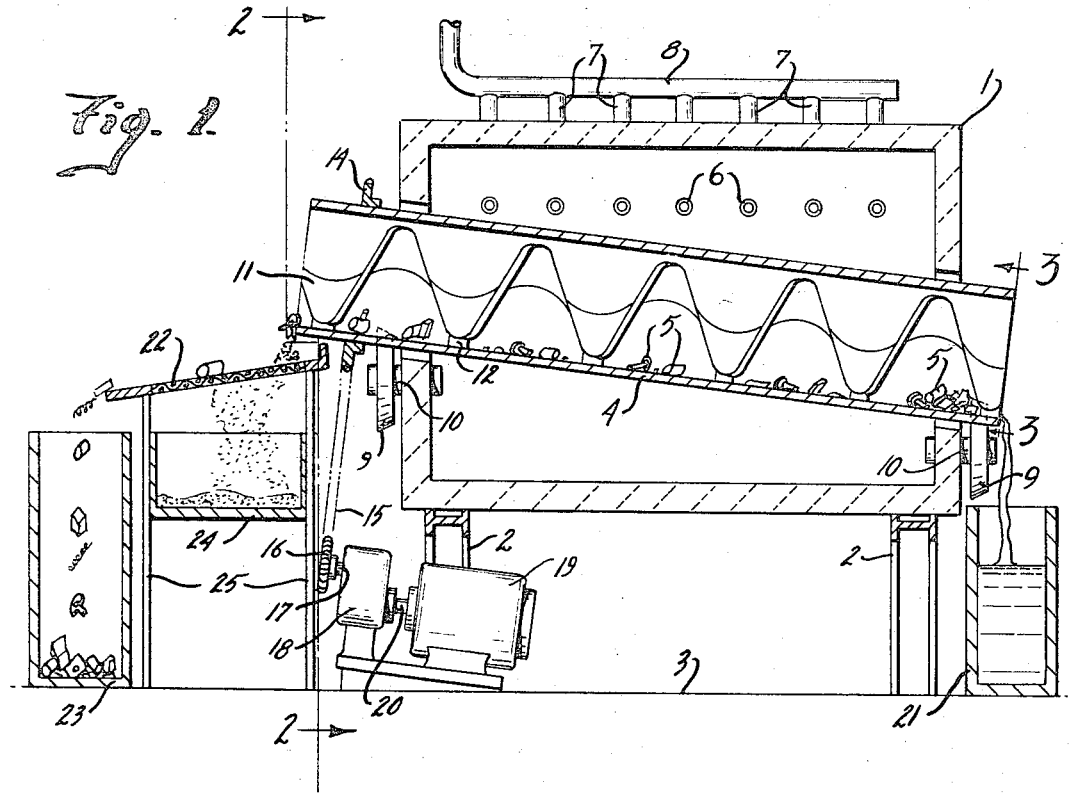
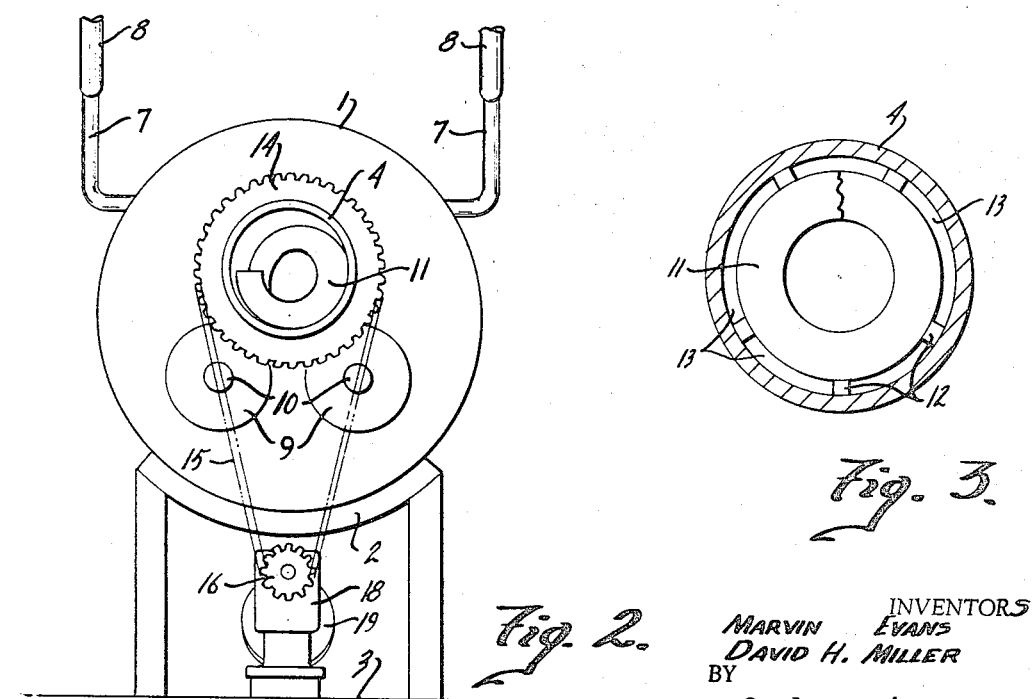
INVENTORS
MARVIN EVANS
DAVID H. MILLER
BY
Andrus & Starke
Attorneys

United States Patent Office 3,401,925
Patented Sept. 17, 1968

3,401,925
APPARATUS FOR SEPARATING MATERIALS
Marvin Evans, Bayside, and David H. Miller, Whitefish Bay, Wis., assignors, by mesne assignments, to College Research Corp., Whitefish Bay, Wis., a corporation of Wisconsin
Filed Sept. 29, 1965, Ser. No. 491,139
6 Claims. (Cl. 266—37)

ABSTRACT OF THE DISCLOSURE

The disclosure relates to an apparatus for separating metals and comprises an inclined tube or retort which is mounted for rotation about its axis within a furnace. A spiral flight is secured within the retort and scrap material is fed into one end of the retort and is carried through the retort by the spiral flight. As the material moves within the retort, the lower melting point alloy is melted and flows downwardly along the inner wall of the retort through openings or slots in the periphery of the spiral flighting and is collected in a container at the low end of the retort. The unmelted higher melting point alloy is moved through the retort by the spiral flight and is collected in a separate container.

---

This invention relates to an apparatus for separating materials and more particularly to an apparatus for separating two different alloys from scrap metal.

Scrap metal in many cases consists of two or more different alloys and generally this type of scrap has very little value unless the metals are separated. For example, zinc or aluminum alloy die castings generally contain small elements of iron or steel, such as bushings, bolts, screws, jets, etc. which cannot be conveniently separated from the die cast alloy except through the use of expensive hand labor. These die cast alloys containing the small iron or steel parts have very little value for scrap purposes, and processes have been devised in the past in an attempt to economically separate the die cast alloys from the ferrous metals.

The present invention is directed to an apparatus for separating two alloys from scrap metal, in a continuous process. In general, the apparatus comprises an inclined tube or retort which is mounted for rotation about its axis within a furnace. A spiral flight or auger blade is secured within the retort and the scrap metal is fed manually, or by a feeding mechanism, into the lower end of the retort and the scrap is carried upwardly through the retort by the spiral flight. As the scrap moves upwardly within the retort the lower melting point alloy is melted and flows downwardly along the inner wall of the retort through openings or slots in the periphery in the spiral flighting. The molten alloy flows from the low end of the retort and is collected in a container. The unmelted higher melting point alloy scrap moves upwardly within the retort and falls from the upper end of the retort onto a screen which serves to separate the fines or dust from the larger pieces of scrap. The larger pieces of the higher melting point alloy move across the screen and fall into a container, while the fines or dust pass through the screen and are collected in a separate container.

The apparatus of the invention provides for a separation of two alloys of different melting points and also separates the fines or dust of the high melting point alloy from the larger pieces of the high melting point alloy. A clean metal separation results with little skimming required, and the remaining pieces of the higher melting point alloy are relatively free of oxides and scum. Due to the tumbling action provided by the spiral flight and the rotating retort, the softer metals and oxides are knocked off of the harder metals so that a mechanical separation is also provided by the apparatus.

With the use of the rotating retort, a very close temperature control can be obtained and due to the improved temperature control, the amount of metal oxide formed is minimized so that there is no appreciable loss of metals due to oxide formation.

The speed of rotation of the spiral flight also serves as a time control so that the scrap can be kept in the melting zone for the desired period of time.

By conveying the higher melting point alloy pieces to the high end of the retort and removing the molten low melting point from the low end, a better separation of materials is provided. Moreover, it is easier to manually feed the scrap into the low end of the retort, and as the high melting point pieces are discharged from the high end, larger containers can be positioned under the high end to collect the pieces.

Other objects and advantages will appear in the course of the following description.

The drawings illustrate the best mode presently contemplated of carrying out the invention.

In the drawing:

FIG. 1 is a vertical section taken through the apparatus of the invention;

FIG. 2 is an end view taken along line 2—2 of FIG. 1; and

FIG. 3 is an end view of the retort taken along line 3—3 of FIG. 1.

The drawings illustrate an apparatus for separating scrap metal into its alloy components and comprises a furnace 1 which is mounted on supports 2 resting on foundation 3. An inclined tube or retort 4 is mounted for rotation within aligned openings in the end walls of the furnace 1, and scrap pieces 5 are introduced either manually or by a suitable feed mechanism into the lower end of the retort and travel upwardly to the high end.

Heat is applied to the scrap metal traveling within the retort by a series of gas jets 6 which are located above retort 4. Each of the gas jets 6 is connected to an inlet tube which extends through the wall of the furnace and each tube 7 is connected to a manifold 8 which supplies gas to the jets. While the drawings illustrate the heating being applied by means of the gas jets, it is contemplated that any other type of heating can be used to heat the scrap as it moves within the furnace 1.

The retort 4 is mounted for rotation on a series of rollers 9 which are journalled on shafts 10 extending outwardly from the end walls of the furnace.

A spiral flight 11 is secured to the inner surface of the retort 4 and serves to convey the scrap upwardly within the retort as the retort is rotated. As best shown in FIG. 3, the outer periphery of the flight 11 is spaced from the inner surface of the retort by a series of spacers 12 so that a series of passages 13 are provided between the periphery of the spiral flight 11 and the inner surface of the retort 4. As the scrap moves upwardly within the retort by action of the spiral flight, the lower melting point alloy will melt and the molten alloy will flow downwardly along the walls of the retort 4, through the passages 13, to the low end of the retort.

To rotate the retort 4, a sprocket 14 is secured to the upper end of the retort adjacent the end wall of the furnace 1 and the sprocket 14 is connected by a chain 15 to a drive sprocket 16 mounted on the output shaft 17 of the speed-reducing unit 18. Motor 19 drives the input shaft 20 of speed-reducing unit 19.

As the retort 4 rotates, the spiral flighting 11 acts to convey the scrap upwardly within the retort to the high end. As the scrap moves upwardly it is heated to a temperature above the melting point of the low melting point alloy and below the melting point of the high melting point to thereby melt the low melting point alloy components, such as zinc or aluminum. The molten low melting point alloy flows downwardly along the inner wall of retort 4 through the passages 13 to the low end of the retort and is collected in a container 21.

The high melting point alloy components, such as steel or cast iron, are carried toward the high end of the retort by rotation of the spiral flighting 11 and are discharged from the high end onto a screen 22 which serves to separate the larger pieces of the high melting point alloy from the dust or fines. As shown in the drawings, the screen 22 is inclined and the larger pieces of the high melting point alloy will move across the top surface of the screen and are collected in a container 23, while the dust or fines will pass through the screen and is collected in a second container 24. Screen 22 is supported from foundation 3 by legs 25.

While the drawings illustrate the use of a stationary screen 22, it is contemplated that the screen can be oscillated, either manually or automatically to improve the separation between the fines and the larger particles of the high melting point alloy.

Exhaust hoods 26 and 27 are located over the upper and lower ends of the retort and serve to vent any gases or oxides produced by the melting action within the retort 4.

The apparatus of the invention provides a complete and effective separation of the low melting point alloy from the high melting point alloy. In addition, the larger pieces of the high melting point alloy are separated from the fines or dust of the high melting point alloy by the screen 22. As the low melting point alloy is discharged from the low end of the retort, the high melting point alloy is discharged from the high end, and a more complete separation of the two materials is achieved which increases the value of the separated metals. Feeding of the scrap into the retort is also facilitated because the feeding is done at the low end. Feeding at the high end is not as satisfactory because the high end is generally at a level which is difficult to reach by the workmen, so that scaffolding is normally used in order to facilitate feeding of the scrap into the upper end of the retort.

The tumbling action provided by the retort and the spiral flight tends to separate the low melting point materials from the high melting point materials by a mechanical action as well as the melting action. Furthermore, the tumbling action results in both the molten metal and the unmelted scrap particles being in a clean state generally free of oxides and scum.

As the scrap is not directly heated but is contained within the rotating retort a more accurate control of the temperature can be obtained resulting in minimum oxide formation and loss of metal in the form of oxides.

The process provides for the separation of three distinct phases; the molten low melting point alloy from the low end of the retort, and the higher melting point pieces and the higher melting point fines or dust from the higher end of the retort. Separation of the three materials is accomplished in a continuous operation with a resulting cost savings.

Various modes of carrying out the invention are contemplated as being within the scope of the following claims particularly pointing out and distinctly claiming the subject matter which is regarded as the invention.

We claim:

1. An apparatus for separating metals, comprising an inclined tube to convey a material composed of a higher melting point substance and a lower melting point substance with the material adapted to be introduced into one end of the tube and discharged from the other end of the tube, means for rotating the tube about its axis, a spiral flight secured to the inner surface of the tube, passage means extending through the flight at the inner surface of the tube, and heating means for heating the material within the tube to a temperature above the melting point of the lower melting point substance to melt the same and below the melting point of the higher point substance, the molten lower melting point substance flowing downwardly along the inner surface of the tube through said passage means to the lower end of said tube.

2. An apparatus for separating metals, comprising an inclined tube to convey a material composed of a higher melting point substance and a lower melting point substance with the material adapted to be introduced into the lower end of the tube and discharged from the higher end of the tube, means for rotating the tube about its axis, a spiral flight secured to the inner surface of the tube, said flight including a series of helical convolutions and each convolution having at least one opening adjacent the inner surface of the tube, and heating means for heating the material within the tube to a temperature above the melting point of the lower melting point substance to melt the same and below the melting point of the higher point substance, the molten lower melting point substance flowing along the inner surface of said tube and through said openings to the lower end of the tube.

3. An apparatus for separating materials, comprising an inclined retort to convey a material composed of a higher melting point substance and a lower melting point substance with said material adapted to be introduced into one end of the retort and discharged from the other end thereof, means for rotating the retort about its axis, a spiral flight secured within the retort with the outer periphery of said flight being spaced inwardly of the inner surface of the retort to provide a passage therebetween, heating means for heating the material within the retort to a temperature above the melting point of the lower melting point substance to melt the same and below the melting point of the higher melting point substance, the molten lower melting point substance flowing along the inner surface of the retort through said passage to the lower end of the retort, and collection means located at the lower end of the retort for collecting the molten lower melting point substance.

4. In an apparatus for separating materials, an inclined retort having a high end and a low end and disposed to convey a material composed of a higher melting point substance and a lower melting point substance with said material adapted to be introduced into one end of the retort and discharged from the other end, conveying means disposed within the retort for conveying the material therein, spacing means disposed within said retort for spacing the conveying means from the retort, said spacing means being discontinuous to provide a substantially continuous passage between the conveying means and the retort extending along a substantial length of the retort, and heating means for heating the material within the retort to a temperature above the melting point of the lower melting point substance to melt the same and below the melting point of the higher melting point substance, said passage being arranged to receive and conduct the lower melting point substance to the low end of the retort.

5. The apparatus of claim 4, wherein said conveying means is a spiral flight and said spacing means is located at spaced intervals along the peripheral edge of said spiral flight, and said apparatus includes means for rotating the retort about its axis.

6. The apparatus of claim 3, wherein said spiral flight operates to convey the material from the low end of the retort to the high end, and said apparatus includes second collection means located at the high end for collecting the unmelted higher melting point alloy.

References Cited

UNITED STATES PATENTS

| | | | |
|---|---|---|---|
| 1,618,338 | 2/1927 | Hoffman | 198—215 X |
| 2,701,067 | 2/1955 | Harbordt et al. | 214—21 |
| 2,852,418 | 9/1958 | MacDonald | 266—33 |
| 3,031,807 | 5/1962 | Bylsma et al. | 210—189 X |
| 3,193,273 | 7/1965 | Miller et al. | 266—33 X |
| 3,278,001 | 10/1966 | Andrews | 198—213 |

J. SPENCER OVERHOLSER, *Primary Examiner.*

E. MAR, *Assistant Examiner.*